United States Patent

[11] 3,626,402

| | | |
|---|---|---|
| [72] | Inventor | Raymond G. Price<br>Milwaukee, Wis. |
| [21] | Appl. No. | 26 |
| [22] | Filed | Jan. 2, 1970 |
| [45] | Patented | Dec. 7, 1971 |
| [73] | Assignee | Allis-Chalmers Manufacturing Company<br>Milwaukee, Wis. |

[54] WARNING SYSTEM FOR COMBINE
15 Claims, 2 Drawing Figs.

[52] U.S. Cl. .................................................. 340/267 R,
56/DIG. 15
[51] Int. Cl. ................................................ G08b 19/00
[50] Field of Search ......................................... 340/267,
271, 213.1, 213; 56/DIG. 15

[56] References Cited
UNITED STATES PATENTS

| | | | |
|---|---|---|---|
| 3,368,214 | 2/1968 | Swanson ........................ | 340/271 |
| 3,260,063 | 7/1966 | Johnson ........................ | 340/231.1 X |
| 2,858,528 | 10/1958 | Diener, Jr. ..................... | 340/213.1 |

Primary Examiner—Donald J. Yusko
Assistant Examiner—Michael Slobasky
Attorneys—Kenneth C. McKivett, Lee H. Kaiser and Robert B. Benson ABSTRACT: A fail-safe monitoring device for a self-propelled combine harvester has a plurality of signal lights mounted in the operator's platform in the field of view of the operator and a plurality of pairs of electrical contacts each of which is connected in series with one of the signal lights across the battery of the harvester. The pairs of contacts are controlled by displaceable members of the harvester such as a straw walker door, a concave, and a parking brake and are held closed to light the signal lights when the harvester is functioning normally. All of the signal lights connected with the pairs of contacts are of the same color and intensity. The normally closed contacts and normally lit lights are fail-safe since any wiring error or burned out lamp cannot be mistaken as a normal operating condition. If a malfunction occurs in the harvester, one of the displaceable members is moved and opens the associated pair of contacts and extinguishes the corresponding signal light. Oscillator means are provided for flashing a signal light of another color on and off in response to the opening of any one of the pairs of contacts, and such oscillator means are preferably astable multivibrator means having a NOR gate input stage with a plurality of resistance input branches each of which is connected to one of said pairs of contacts.

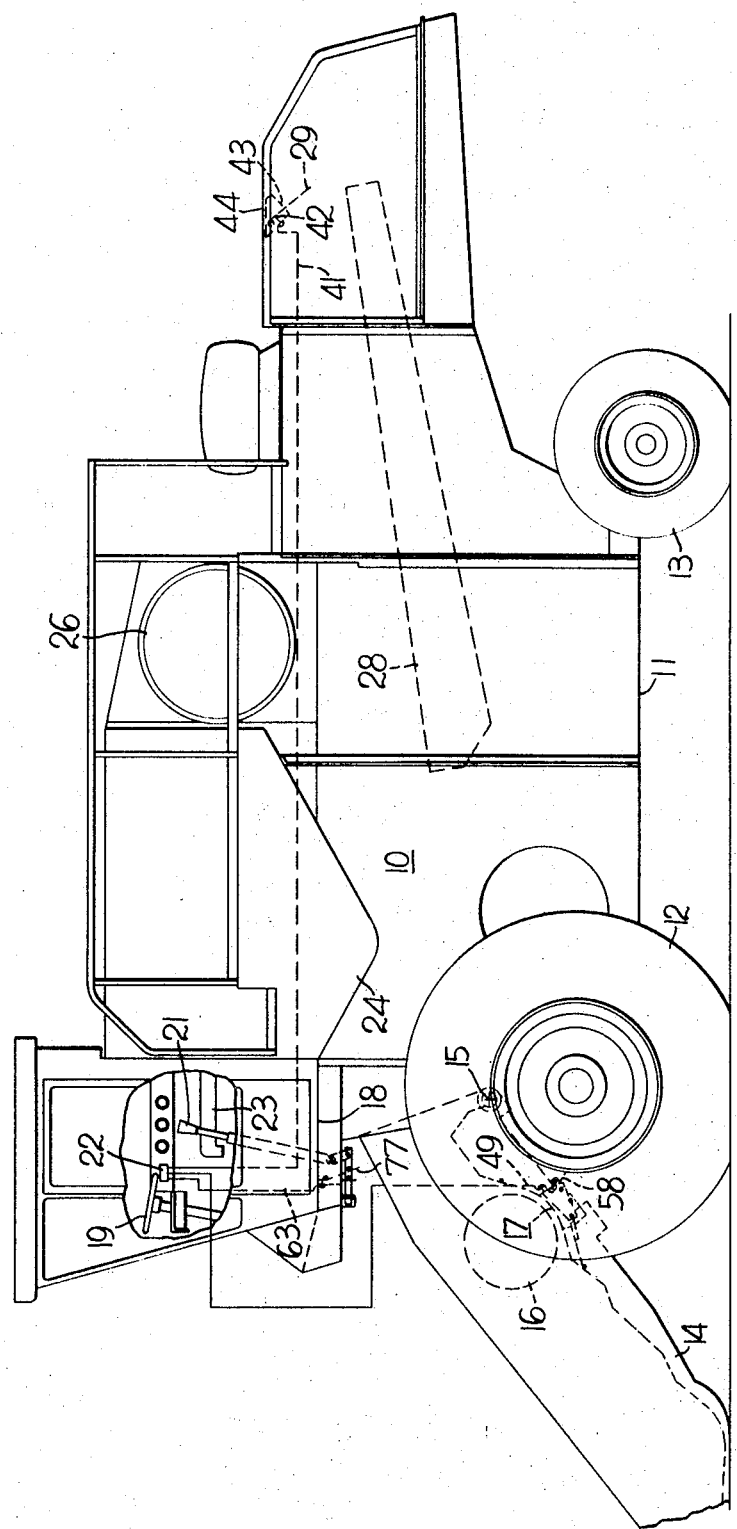

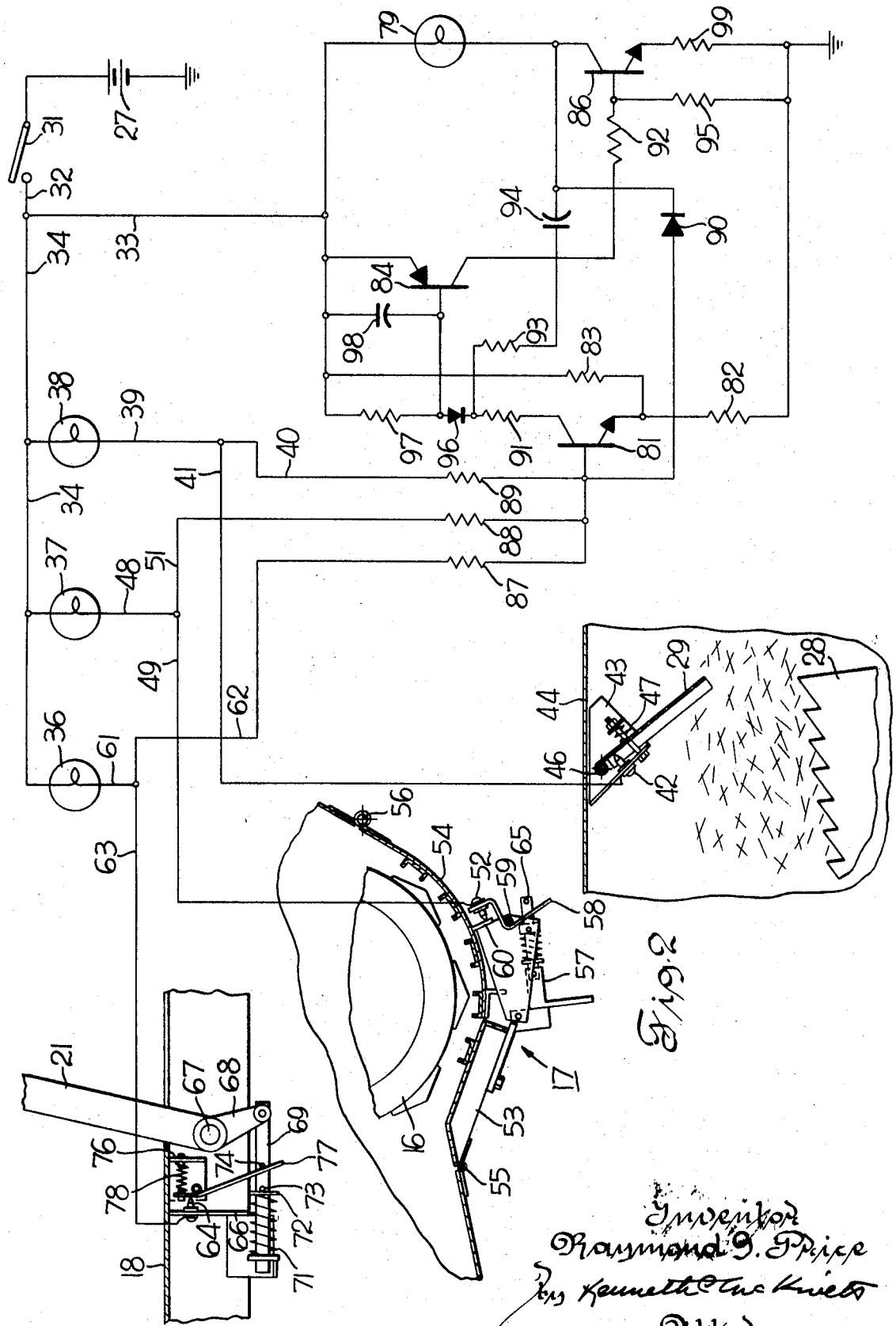

WARNING SYSTEM FOR COMBINE

This invention is concerned with a monitoring device for a combine harvester. Combine harvesters are very large, expensive and complicated pieces of farm machinery and are used for harvesting grain crops. Because these machines are so large and complicated, many of the functions of the machines cannot be observed by the operators who are being kept busy steering the combines on a desired course and avoiding obstacles.

Accordingly, it is an object of the invention to provide a monitoring device for a combine harvester wherein such device monitors a particular function of the machine and reports to the operator the performance or lack of performance of the particular function.

It is a further object of this invention to provide a monitoring device which is fail-safe.

A further object of this invention is to provide a monitoring device which can monitor a plurality of functions in a combine and which functions are usually not ascertainable from the operator's platform.

A further object of this invention is to provide an electronic monitoring device for a combine harvester wherein the electronic components are packaged in one unit and with such unit being positioned at the operator's station.

These and other objects will become apparent from the following detailed description and accompanying drawings wherein:

FIG. 1 is a side elevation of a self-propelled combine harvester embodying the invention with certain parts shown diagrammatically for purposes of illustration; and FIG. 2 is an enlarged side elevation of a portion of FIG. 1 with some parts shown in section in conjunction with a wiring diagram.

Referring to FIG. 1, a combine harvester 10 embodying the invention is shown. This harvester includes a frame 11 supported on front traction wheels 12 only one of which is shown. A header 14 pivotally mounted at the forward end of the harvester for movement about axis 15 includes a threshing cylinder 16 and a coacting concave 17. An operator's platform 18 is mounted on the forward end of frame 11 and includes a steering wheel 19 operatively connected to dirigible wheels 13 by means (not shown). The usual controls for a self-propelled combine are located about the operator's platform including an emergency brake 21 pivotally mounted on the lower portion of operator's platform 18, a monitoring unit 22 is mounted so that an operator sitting on seat 23 will have the unit 22 in his view as he watches the header and ground area in front of the header.

To the rear of operator's platform 18 is located a grain tank 24 for collecting harvester grain and to the rear of tank 24 is an internal combustion engine 26 including a source of electrical energy 27 which preferably is a battery (see FIG. 2). A straw walker 28 (see FIG. 1) extends longitudinally for discharging straw at the rear end of the machine. A finger 29 is pivotally mounted over the rear end of straw rack 28 for a purpose that will be hereinafter described.

Referring to FIG. 2, the battery 27 has its negative terminal connected to the grounded frame 11. The positive terminal of battery 27 is connected to ignition switch 31 of harvester 10. A lead 32 from switch 31 divides into two leads 33 and 34, and lead 34 connects signal lights 36, 37 and 38 in parallel. Lights 36, 37 and 38 are disposed in monitoring unit 22. Lead 39 extending from light 38 divides into two leads 40 and 41. Lead 41 is attached to switch member 42 insulatingly carried by bracket 43 which is attached to the roof 44 of the harvester as shown in FIG. 1. As shown in FIG. 2, switch member 42 is contacting pivotally mounted member or orifice 29 which is mounted for pivotal movement about transverse axis 46. When a normal amount of straw is being moved by straw walker 28, member 29 stays in the position shown as it is biased to this position by spring 47 so that members 42 and 29 constitute a pair of normally closed contacts. Finger 29 is connected to grounded frame 11, and with switch member 42 contacting member 29, current flows through light 38 lighting same. Light 38 is a green light of relatively low intensity and is mounted in unit 22 (FIG. 1) and when lit indicates that straw walker 28 is functioning properly. If straw walker 28 were plugged resulting in finger 29 (FIG. 2) pivoting counterclockwise away from switch member 42 against the bias of spring 47, the circuit connection to ground would be broken and light 38 would go out indicating the straw walker was plugged.

Lead 48 from light 37 divides into two leads 49 and 51. Lead 49 is connected to a switch contact 52 which is insulatingly mounted on an arm 58 carried by the right-hand portion 54 of concave 17. Concave 17 is made up of two portions 53 and 54 that are mounted for pivotal movement about transverse axes 55 and 56, respectively, and are connected by a latch assembly 57 in the manner shown in U.S. Pat. No. 3,101,721 which issued Aug. 27, 1963. Arm 58 is pivotally connected to latch assembly 57 by means of a pivot bolt 59, and a torsion spring (not shown) positioned about bolt 59 biases arm 58 in a counterclockwise direction to position switch contact 52 into engagement with a metallic bracket 60 on latch assembly 57, thus providing a passage to ground for energy passing through light 37. With latch assembly 57 positioned as shown, light 37 would be lit and be of a green color indicative to the operator that the concave 17 was positioned in normal operating position. The intensity of light 37 would be the same as light 38 and light 36. If latch assembly 57 is open so that concave 17 is not positioned to coact with cylinder 16, the two portions 53 and 54 of concave 17 separate and a pin 65 strikes arm 58 and pivots it in a clockwise direction so that switch contact 52 disengages from bracket 60 and light 37 is not lit, thus indicating to the operator that there was a malfunction.

Lead 61 extends from light 36 and divides into leads 62 and 63. Lead 63 is connected to insulated switch member 64 which is carried by bracket 66 attached to the under portion of operator's platform 18. Emergency brake 21 is pivotally mounted on pivot bolt 67 carried by bracket 66. Brake 21 is provided with a lower lever portion 68 which is pivotally connected to a brake operating member 69 which is operatively connected to a braking mechanism for the traction wheels 12 by means not shown. The left-hand end of member 69 is surrounded by a spring 71 which biases member 69 to the right, or brake disengaged position, by pushing against a washer 72 which in turn contacts a pin 73 carried by member 69.

A bracket 76 is attached to bracket 66 and pivotally supports a bellcrank lever 77 which has its upper end biased into contact with switch member 64 by means of a spring 78. This contact between member 77 and switch member 64 provides a ground to frame 11 for the current flowing through light 36. Pin 74 forms a stop member for bellcrank 77, and when brake lever 21 is applied by moving the upper portion of brake lever 21 rearwardly, pin 74 carried by operating member 69 moves to the left causing bellcrank 77 to move counterclockwise compressing spring 78 and moving away from contact with switch member 64 and thereby opening the light circuit and causing light 36 to go out. This light 36 being out is an indication to the operator that his emergency brake is applied. Light 36 is green in color and is of the same intensity as lights 37 and 38 and all three lights burn steadily when on.

The inputs 40, 51 and 62 to the electronic circuitry as shown in FIG. 2 are the conditions (opened or closed) of switches 42–29, 52–60, and 64–77. These switches form a part of the mechanical subsystem on the combine. As long as these subsystems function with no change, the switches will remain closed and lights 36, 37 and 38 will remain on. This combination of normally closed switches and normally on lights provides an essentially fail-safe system since any wiring error, switch failure or burnt-out light bulb cannot be mistaken as a normal operating condition since the light will always go out. If a switch should open, the series light will go out isolating the particular problem area for the operator. Any combine subsystem whose operating mode can be described by a switch can serve as an input to the electronic circuit and the number of inputs is essentially unlimited.

The purpose of the electronics in FIG. 2 is to monitor the condition of the switches and when any or all of them open, light 79 will flash to draw the operator's attention. Once the operator detects the flashing light 79, he inspects the other lights 36, 37 and 38, to isolate the problem and corrects it.

Relaxation oscillator means are provided for flashing light 79 on and off in response to the opening of any one of the switches 42-29, 52-60, or 64-77, and preferably such oscillator means comprises astable, or free running multivibrator means having three stages of transistors 81, 84 and 86, and light 79 is connected in the collector circuit of the output stage transistor 86.

The switches 42-29, 52-60, and 64-77 are coupled to the respective resistance input branches of a transistor-resistor logic NOR circuit, or NOR gate input stage of the astable multivibrator means comprising NPN-transistor 81 whose base is coupled through resistance 87, 88 and 89 respectively to the leads 62, 51 and 40. When all three switches 42-29, 52-60 and 64-77 are closed, the base of transistor 81 is connected to the frame ground through the switches and the base-emitter junction of transistor 81 is reverse biased by voltage divider comprising two resistors 82 and 83 connected in series between the frame ground and the positive terminal of the battery over leads 33, 32 and ignition switch 31. The collector of transistor 81 is connected through a resistance 91 to the base of PNP-transistor 84 which comprises the second stage of the free running multivibrator means, and the positive voltage on the collector of transistor 81, when it is biased OFF and no output signal is provided by the NOR gate, biases the base of second stage PNP-transistor 84 so that it is cut off. The third stage transistor 86 is controlled by second stage transistor 84 and is biased OFF when transistor 84 is OFF, and therefore the light 79 in the output circuit of the astable multivibrator stays off as long as all the switches 42-29, 52-60 and 64-77 remain closed.

A positive signal over any one of the leads 62, 51 or 40 will cause NOR-gate transistor 81 to be in saturation and provide an output from the NOR gate. When an abnormal condition in the harvester displaces one of the displaceable member 29, 58 or 77 to disconnect the frame ground from switch contact 42, 52 or 64, the positive potential of battery 27 causes current to flow through the corresponding signal light 36, 37 or 38 and the corresponding input resistor 87, 88 or 89 of the NOR gate and forward biases the base-emitter junction of NOR-gate transistor 81 to drive it into saturation. The current flowing through the corresponding signal light 36, 37 or 38 is too small to keep the light on but is sufficient to turn transistor 81 ON.

A resistance 91 is connected in series with a diode 96 and a resistance 97 in the collector circuit of transistor 81. Turning NOR-gate transistor 81 ON lowers the potential at the junction of resistance 97 and diode 96, thereby forward biasing the base-emitter junction of second stage PNP-transistor 84 and turning it ON. Current then flows in a circuit from the positive terminal of battery 27, ignition switch 31 and leads 32 and 33, the emitter-collector junction of transistor 84, resistor 92 and a resistance 95 to ground. The junction of resistances 92 and 95 is coupled to the base of output stage transistor 86, and the voltage developed across resistance 95 forward biases the base-emitter junction of transistor 86 and turns it ON.

When transistor 86 turns ON, current flows from the positive terminal of battery 27, through ignition switch 31 and leads 32 and 33, signal light 79, the collector-emitter junction of transistor 86, and through a resistance 97 to ground, thereby turning signal light 79 ON. The negative-going change of potential at the collector of transistor 86 when it conducts forward biases a diode 90 and clamps the base-emitter junction of NOR-gate transistor 81 in a reverse biased condition or that transistor 81 turns OFF. The turning of transistor 81 OFF removes the forward bias from the base of second stage transistor 84.

When transistor 86 turns ON, a timing capacitor 94 coupled to its collector begins to charge in a circuit which may be traced from the positive terminal battery 27 ignition switch 31 and leads 32 and 33, the emitter-base junction of transistor 84, diode 96, resistance 93, capacitor 94, the collector-emitter junction of transistor 86, and resistor 99 to ground. The voltage drop across resistance 97 caused by the flow of charging current therethrough forward biases the base-emitter junction of second stage transistor 84 and holds it ON, which in turn maintains third stage transistor 86 and signal light 79 ON. When the charging current to capacitor 94 decays to a predetermined magnitude, second stage transistor 84 starts to turn OFF. This reduces the current flow through resistance 95 and immediately turns output stage transistor 86 OFF, thereby turning signal light 79 OFF.

The positive-going change of potential at the collector of transistor 86 when it is turned OFF reverse biases diode 90, thereby removing the reverse bias from the base-emitter junction of NOR-gate transistor 81 and permitting it to turn back ON.

The turning OFF of transistor 86 raises its collector potential to approximately that of the positive battery terminal, thereby raising the negative terminal of the charged capacitor 94 to approximately the positive potential of the battery 27 and its positive terminal to approximately twice the battery potential. The potential on the positive terminal of timing capacitor 94 raises the potential of the base of second stage PNP-transistor 84 above that of its emitter, thereby maintaining it turned OFF and also keeping third stage transistor 86 OFF. Timing capacitor 94 now begins to discharge through a path including resistance 93, resistance 91 and the collector-emitter junction of NOR-gate transistor 81 and resistor 82. After timing capacitor 94 has discharged to a predetermined potential, the base-emitter junction of second stage transistor 84 becomes forward biased and it turns ON. Turning ON of transistor 84 turns on transistor 86 and light 79 again, and the cycle repeats as long as the switch 42-29, 52-60 or 64-77 is open and a positive signal is applied to the base of NOR-gate transistor 81.

This ON-OFF cycle of transistor 86 provides the flashing functions for light 79. Light 79 will continue to flash until the switch (which has been opened) is closed again. The capacitor 98 is used to suppress high frequency electrical noise on the positive power supply terminal. This high frequency noise could turn transistor 84 on falsely and capacitor 98 keeps this from happening, Capacitor 98 is made large enough so that this high frequency noise cannot charge capacitor 98 to a high enough voltage to turn on transistor 84.

Light 79 will not only be a flashing light to attract the operator's attention but it will also be brighter than the other lights and will be red in color.

I claim:

1. In a harvester having a battery, a monitoring system comprising signal lights positioned at the console of said harvester in the field of view of the operator, a plurality of pairs of contacts each of which is operable between open and closed positions by a displaceable member of said harvester and is connected in series with one of said signal lights across said battery, said pairs of contacts being held closed by said displaceable members to maintain the associated signal lights lit when said harvester is functioning normally and each said pair of contacts being operable to open position to extinguish the associated signal light if the associated displaceable member is displaced in response to an abnormal condition in said harvester, means including oscillator means connected in an electrical circuit with another of said signal lights and having a plurality of inputs each of which is coupled to one of said pairs of contacts for flashing said another signal light on and off in response to the opening of any one of said pairs of contacts.

2. In a harvester in accordance with claim 1 wherein said means for flashing said another signal light includes an electronic NOR gate having a plurality of input circuits each of which is coupled to the junction between one of said pairs of contacts and the corresponding signal light and connected to ground through said closed one pair of contacts so that said NOR gate is reverse biased when said plurality of pairs of contacts are in closed position, the opening of one of said pairs of contacts coupling said battery through the corresponding signal light to the associated input circuit and forward biasing said NOR gate.

3. In a harvester in accordance with claim 2 wherein said means for flashing said another signal light includes astable multivibrator means having a plurality of transistor stages and said another signal light is connected in an electrical circuit with the last of said transistor stages and wherein said NOR gate provides an output signal in response to the opening of any of said pairs of contacts and the resulting flow of current through the extinguished signal light and the associated NOR gate input circuit and said astable multivibrator means is operable in response to said output signal to intermittently turn said another signal light on and off, whereby said another signal light flashes intermittently and said one signal light is extinguished when any one of said displaceable members is displaced in response to an abnormal condition in said harvester.

4. In a harvester in accordance with claim 3 wherein said battery is the power supply for said NOR gate and said astable multivibrator means and has one terminal grounded to the metallic frame of said harvester and each of said pairs of contacts includes a contact connected to said one signal light and a movable contact connected to said frame and operable by said displaceable member.

5. In a harvester in accordance with claim 4 wherein said NOR gate comprises the input transistor stage of said astable multivibrator means.

6. In a harvester in accordance with claim 1 wherein said another signal light is of greater intensity than said one signal light.

7. In a harvester in accordance with claim 6 wherein said another signal light is of a different color than said one light.

8. In a harvester in accordance with claim 7 wherein said another signal light is red and said one light is green.

9. In a harvester in accordance with claim 1 wherein one of said displaceable members is a combine straw walker door and holds the associated pair of contacts closed when said door is positioned in operative condition.

10. A harvester in accordance with claim 9 wherein another of said displaceable members is a concave member and holds the associated pair of contacts closed when said concave member is positioned in operative position.

11. In a harvester in acccordance with claim 10 wherein still another of said displaceable members is a parking brake member and holds the associated pair of contacts closed when said brake is in a nonbraking position.

12. In a harvester in accordance with claim 4 wherein said NOR gate includes a transistor, a plurality of input resistances each of which is connected between the base of said transistor and said junction between one of said pairs of contacts and the corresponding signal light, and said means for flashing includes means for biasing said NOR gate transistor to the OFF condition when all of said pairs of contacts are closed.

13. In a harvester in accordance with claim 12 wherein said astable multivibrator means also includes a second transistor stage coupled to the output of said NOR gate transistor input stage and connected to be forward biased in response to said output signal from said NOR gate, a third transistor stage connected to the output of said second stage so that said third stage switches ON when said second stage conducts, said another signal light being connected in the output circuit of said third stage, means responsive to the turning ON of said third stage to reverse bias said NOR gate input stage, and an RC-timing network including a resistance and a timing capacitor connected to be charged in series with said third stage when it is conducting, the charge on said timing capacitor maintaining said second stage cut off for a predetermined interval after said third stage is cut off and the reverse bias is removed from said NOR gate input stage.

14. In a harvester in accordance with claim 13 wherein said astable multivibrator means also includes means responsive to the magnitude of the charging current to said timing capacitor for maintaining said second stage forward biased, subsequent to the turning off of said NOR gate stage, until said charging current decays to a predetermined magnitude.

15. In a harvester having a battery, a monitoring system comprising signal lights positioned at the console of said harvester in the field of view of the operator, a plurality of pairs of contacts each of which is operable between open and closed positions by a displaceable member of said harvester and is connected in series with one of said signal lights across said battery, said pairs of contacts being held closed by said displaceable members when said harvester is functioning normally, astable multivibrator means having a transistor-resistor logic NOR circuit input stage provided with a plurality of input resistor branches each of which is connected to the junction between one of said pairs of contacts and the corresponding signal light, a second transistor stage couples to the output of said NOR circuit, and a third stage having its input coupled to the output of said second stage so that it switches ON when said second stage conducts and having its output circuit connected to another of said signal lights, means responsive to the ON condition of said third stage for reverse biasing said NOR circuit, an RC-timing network including a resistance and a timing capacitor connected in series with said third stage so that said timing capacitor charges through said resistance when said third stage is turned ON, means responsive to the charging current to said timing capacitor for maintaining said second stage forward biased for a predetermined interval after said NOR circuit is reverse biased and until said charging current decays to a predetermined magnitude, said timing capacitor being coupled to the input of said second stage so that the charge thereon maintains said second stage biased OFF for a predetermined interval after said third stage turns OFF and the reverse bias is removed from said NOR circuit.

* * * * *